April 7, 1942.                E. E. KENT                 2,278,451
                SEPARATOR FOR BOTTLED MILK AND CREAM
                       Filed Jan. 25, 1941

INVENTOR
Everett E. Kent

Patented Apr. 7, 1942

2,278,451

UNITED STATES PATENT OFFICE 2,278,451

SEPARATOR FOR BOTTLED MILK AND CREAM

Everett E. Kent, Newton, Mass., assignor of thirty-seven and one-half per cent to Frederick H. McAdams, Revere, and twenty-nine and one-sixth per cent to John B. Neal, Allston, Mass.

Application January 25, 1941, Serial No. 375,877

6 Claims. (Cl. 210—51.5)

This invention relates to improvements in separators for bottled milk and cream.

More particularly it relates to devices for domestic use to divide milk in a bottle by seating a partition at the region of the cream line; so that the milk can be held back while cream is being poured off.

The invention relates to cases where this region is below the neck of the bottle, and is larger than the neck, so that the getting of the partition through the neck requires that the partition be a collapsible plate, and be provided with a handle, and that there be means to expand the plate within the body of the bottle.

It is an object of the invention to provide, between the operator's handle and the dividing plate which the handle carries, a connection affording improved operative action for the collapsing and passing of the plate through the neck, and for a subsequent spreading of the plate within the bottle, so that seating of the plate, in an effective predetermined separating position, may be accomplished better than with prior proposals, automatically or otherwise.

Another object is to avoid using brackets for joining and operating the parts, in the said connection, because brackets involve complications of design, difficulty in construction, objectionable cost, and uncertainty as to sanitary thoroughness of cleaning when in domestic use.

Another object is to provide so that, when the arms which support the plate are pressed together by the operator, the force of gravity will ordinarily contribute to the collapse of the plate.

The improved separator can be self-acting within the bottle, for converting the plate from collapsed condition to spread condition, simultaneously with its positioning itself against the bottle walls at the predetermined level.

For attaining these objects and results the plate is a disk made in two sections, hinged together, on a diameter of the disk, which hang on a handle comprising a pair of rod-like arms that tend resiliently to spread apart, thus to hold the plate spread flat. It is not necessary that the material of the plate itself be resilient.

The hinge of the plate is placed and faced so that, when the operator squeezes the upright spring handle, pushing the opposite edges of the plate nearer together, gravity pulls down the hinged middle of the plate, thus collapsing the plate from disk shape to V-trough shape. The connection of each plate section to its supporting arm of the handle affords the plate section a pin-in-hole guide, first for a curved path of travel of the edge of the plate along the prong end of the arm, for the collapsing; and, second, for the rotation of the collapsed, troughed plate about the end parts of the prongs, for its alignment beside the handle, so that, in semi-circular width, it can pass endwise through the neck of the bottle. When the bottle is filled with milk and cream, this operation is preferably executed with the bottle standing upright, as on a table.

The connection of plate to handle, by which the invention makes this possible, is a simple pair of holes on the diameter of the plate which is perpendicular to the hinge, and prongs, which are the end portions of the handle arms. These latter curve outward in the plane of the arms, which plane is perpendicular to the line occupied by hinge axis when the plate is spread flat. Each prong extends loosely through its hole, near an edge of the plate, but is at its end deformed into a transverse enlargement, herein called a knob, that prevents escape of the plate off the prong. The curve of each prong approximates being a quadrant, from its beginning as a continuation of handle arm to its end knob where the prong is near perpendicularity to the handle arm. When a person squeezes the arms together, the mid-parts of the plate fall a little, so that the hinge line is no longer on dead centre between the holes; and, as the arms move closer together, gravity aids the collapsing of the plate about the hinge. The edge portions having the holes slide along the prongs until they reach the knobs; and if there is any frictional sticking, the pressure of the prongs will enforce the collapsing.

When the squeezing pressure is released, the outward springing of the arms and the guiding curvature of the prongs cooperate to pull the plate to flatness.

At the end of each of these movements the part of each prong which is then in the hole approximates perpendicularity to the plane occupied by that part of the plate in which that hole is.

In a mid-portion of the handle the arms mutually diverge, so that, upon being released when the plate is within a bottle, their resilient urge to get farther apart presses them as a V against opposite edges of the bottle mouth; and this pressure slides them outward. The plate is thus drawn upward within the interior of the bottle, to seat itself coincidently with its reaching a state of flatness. Or, if in cleaning or other handling the metal of the handle has become bent from the angle necessary for precise registration, a person can easily seat the plate, against the sloping interior of the bottle body near the neck, by pulling outward on the handle. The top part of the contents can then be easily poured while all below the plate is held back by the plate. Removal of the plate is easily effected by pinching the handle and pushing it further into the bottle, thus collapsing the plate, and then swinging the plate on the handle prongs, into parallelism with the handle, by pressing the plate against the side of the bottle while drawing it out.

It is intended that the patent shall cover, by suitable expression in the appended claims, whatever features of patentable novelty exist in what is here disclosed.

Figure 1:
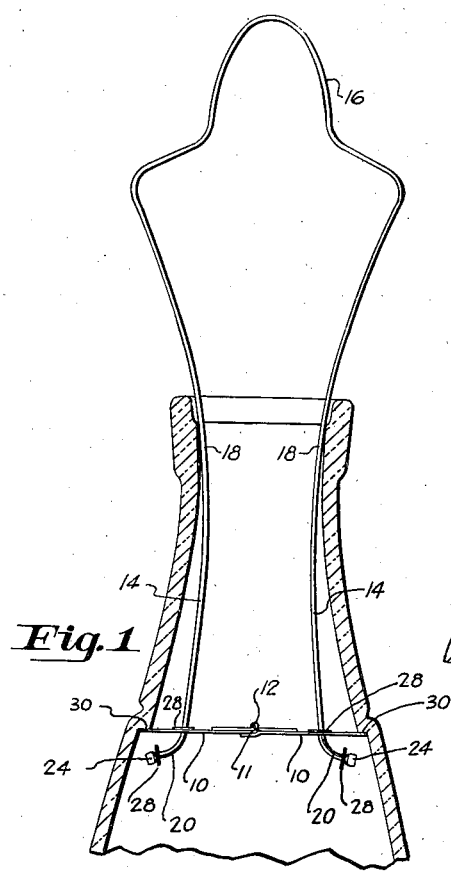
Figure 1 is a side elevation, in medial vertical section through the upper part of a milk bottle, showing seated within the bottle a separator embodying features of the invention.
Figure 2:
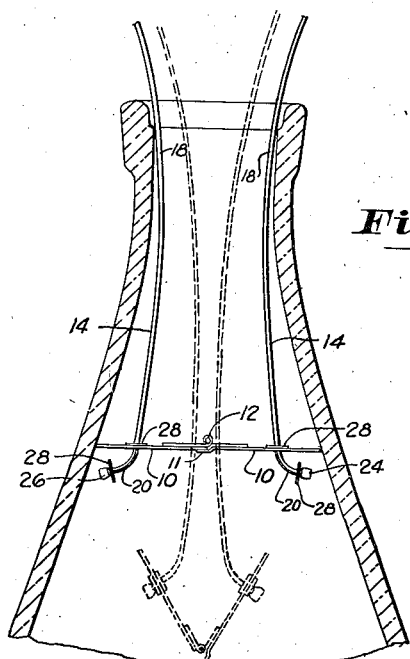
Figure 2 is a similar view of a conventional bottle with smooth interior walls, the upper part of the separator arms being broken away, and the separator being indicated by dotted lines in collapsed condition.
Figure 4:
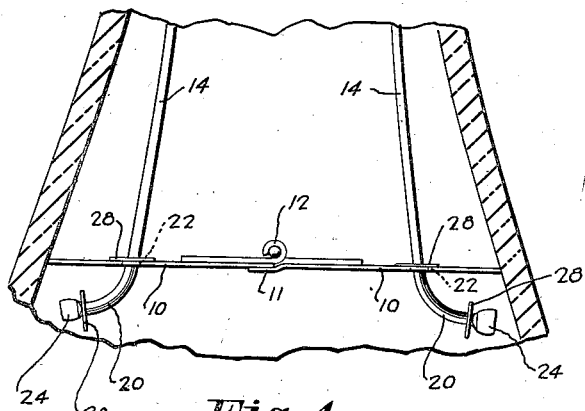
Figure 4 shows the separator plate collapsed within a bottle, as on its way in or out.
Figure 3:
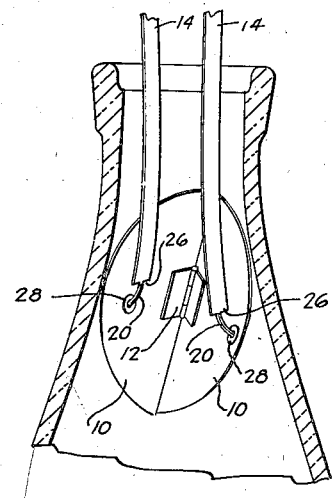
Figure 3 is a similar view of a fragment, on an enlarged scale.

Referring to the drawing, the collapsible plate may be of any suitably stiff material, which need not be resilient, in two semi-circular parts 10, 10, hinged together as at 12. Conveniently its two halves may be stamped from thin non-corrodible sheet material, as metal; and they may be formed for the pin of the hinge 12, to lie on that side of the plate plane which is toward the handle so that the halves fold together upward. To constitute a stop for determining position of the halves to make a flat condition of the plate, one of the parts 10 may extend a little under the other half, as at 11. This post-diametral margin closes the crack between the halves, so that when in use no appreciable quantity of liquid can escape past the plate at the hinge line.

The plate is speared on the prong ends of a handle having two arms 14, 14, which are connected together, at a distance from the plate, by means which is resilient and yieldingly urges apart the plate-carrying ends of the arms. This handle structure, and the resilience, are conveniently provided integrally by a strip of spring metal, whose mid-length portion is curved, normally in U-shape, with the bow 16 of the U resiliently urging its arms 14, 14 to spread somewhat apart—to a span which is greater than the width of their attachment to the plate. The arms 14, 14 taper together, from outside of the bottle toward the plate, so that the mid-length part of the handle has gradually spreading extent, as at 18, 18, in direction away from the plate, for engagement with the lip of the bottle. When the plate has been thrust into the bottle to below its seat, and the pinched arms are released, their resilience spreads them until they encounter the bottle lip; and the angle between them is large enough so that their tendency to expand the handle, reacting against the inside of the bottle lip, slides the handle outward, thus drawing the plate toward its seat simultaneously with the spreading of those arms and their spreading of the plate.

The invention relates more particularly to the collapsible plate, and its operative connection to the arms 14, 14. For adequacy of strength and convenience of handling the arms can be made of flat strip metal.

The prong-like end portion of each arm 14 is an outward quadrant curve, preferably of small round cross-section, whose base portion rises from a shoulder 26 on the arm, and whose tip end is a knob 24. In the form illustrated it is merely a portion of the arm strip, reduced in width, bent outward on the quadrant curve, and extending through a round hole 22 in one of the plate sections 10, near the peripheral margin of the section. The size of the hole 22, as compared with the cross section of arm end 20, is enough larger to permit the quadrant of arm to slip freely back and forth through the hole. The knob 24 at the free end of the prong may be any suitable head or stop for maintaining the plate section against slipping off the end of the curve. Herein it is illustrated as being an enlargement of the arm in one dimension of cross-section, made by pinching the round metal into flat shape. A shoulder 26, where the prong begins its quadrant shape, constitutes a stop for the plate at its flatwise position. Loose washers 28 whose holes are smaller than the holes 22 and whose diameters are larger than those holes, preferably are strung on the prongs, one on each side of the plate section 10.

The curvature of the prongs 20, 20 plays an important part in the operability of the separator. When the device is held upright, plate down, the arms 14, 14, resiliently tending to spread further apart, can spread until the plate is drawn flat and straight from prong to prong. In this state the plate is seated against the shoulders 26, 26, with the loose washers covering whatever area of each hole 22 is not filled by the body of its prong. The curvature of the prongs is such that in moving between this and the collapsed position each curve acts as a guide and cam for sliding its plate section 10 along the prong so that all of the way along the part of the prong which is at the instant within the hole is approximately perpendicular to the plane of that part of the plate in which the hole is. So, when the arms are squeezed together, this curve permits the plate sections initially to fall by gravity along the prongs 20, 20; and when the squeezing has proceeded far enough, lets the middle of the plate fall into V-form, hanging loosely on the end parts of the prongs 20, 20.

For use, the separator may be inserted into a bottle, with the arms squeezed together and the plate in V-form tilted with its hinge near parallelism with the handle, until the plate is immersed below the cream line. On release of the squeeze, the arms spring apart, snapping the plate sections to flatness. Simultaneously, their expanding oblique portions 18, engaging and confined by the lip of the bottle, and slipping on it, cause the whole to ride outward of the bottle, thus drawing the plate outward to become seated against a narrow part of the bottle walls.

The hinged characteristic of the collapsible plate, and the outward-curving knob-ended prongs 20, 20, combined therewith, assure that the plate will be brought to flatness as the arms 14, 14 spread. Obviously the angular spread of the arms has to be coordinated with the size of bottle lip and the extent of spread the arms are to possess when the plate has become flat, which terminates their spreading.

The removal of the separator from a bottle is easily accomplished by pressing the arms downward and together, letting the submerged plate collapse to V-form as it descends; and then withdrawing the plate with its hinge riding along the walls of the bottle neck.

I claim as my invention:

1. In a separator for cream from milk in a bottle, wherein a collapsible partition plate, for fitting the interior cross-section of a milk bottle at the region of the cream line of its contents, is combined with means for passing the collapsed plate through the bottle neck, and for bringing the plate to flatness, that improvement wherein the plate is in two sections hinged together, and said means comprises a pair of plate-holding arms which are movable resiliently toward each other; are connected to the plate sections on opposite sides of the hinge line of the plate, each having an outward curving prong which extends loosely through a hole in its plate section, and has terminal means holding the plate section on the prong; the relation of said hole and prong being one of looseness wherein the hole is large enough for its plate section to slip along the prong when the plate departs from flatness by movement of the sections about the axis of the hinge; said arms having mid-regions of mutual taper toward the plate from beyond a place where the arms engage within the bottle mouth, the outer ends of said arms being connected together and there being resilience continually urging apart the said bottle-mouth-engaging regions; and the angle of said taper of arms being sufficient for the said resilience to overcome friction between arms and mouth and so to slide them outward on the bottle lip, simultaneously with their spreading of the plate to flatness.

2. A separator as in claim 1, wherein there is a shoulder on each arm at the base of its terminal prong, constituting a stop for its plate section, located to engage the plate when the plate becomes spread to flat condition.

3. A separator as in claim 1, wherein one plate section has a diametral margin which overlaps the other section a little at the hinge line, preventing leakage when the plate is in spread condition.

4. A separator as in claim 1, wherein the base portions of the prongs are near mutual parallelism, when the arms are spread, whereby a gravity drop of the hinged region of the plate can occur, to remove the hinge from dead centre, when said prongs are pressed toward each other enough to become loose in their holes.

5. A separator as in claim 1, wherein a washer is loose on each said prong loosely located on each side of its plate section, covering the hole through which the prong passes and not so loose on the prong as the prong is in the plate.

6. A separator as in claim 1, wherein the said terminal prong of each arm is a quadrant prong.

EVERETT E. KENT